United States Patent
McLaughlin et al.

(10) Patent No.: US 12,265,988 B2
(45) Date of Patent: Apr. 1, 2025

(54) SYSTEM AND METHOD FOR IDENTIFYING HIDDEN CONTENT

(71) Applicant: DoubleVerify, Inc., New York, NY (US)

(72) Inventors: Matthew McLaughlin, Severna Park, MD (US); Roy Kalman Rosenfeld, Jerusalem (IL); Lahat Michael Abu, New York, NY (US); Lior Simon, New York, NY (US)

(73) Assignee: DoubleVerify, Inc., New York, NY (US)

( * ) Notice: Subject to any disclaimer, the term of this patent is extended or adjusted under 35 U.S.C. 154(b) by 0 days.

(21) Appl. No.: 17/469,699

(22) Filed: Sep. 8, 2021

(65) Prior Publication Data

US 2021/0406953 A1    Dec. 30, 2021

Related U.S. Application Data

(63) Continuation of application No. 14/535,873, filed on Nov. 7, 2014, now abandoned.
(Continued)

(51) Int. Cl.
*G06Q 30/0241*    (2023.01)
*G06F 16/951*    (2019.01)
(Continued)

(52) U.S. Cl.
CPC ...... *G06Q 30/0248* (2013.01); *G06F 16/951* (2019.01); *G06Q 30/0201* (2013.01);
(Continued)

(58) Field of Classification Search
CPC ..................................... G06Q 30/0207–0277
(Continued)

(56) References Cited

U.S. PATENT DOCUMENTS

| 4,649,264 A | 3/1987 | Carson |
| 5,689,253 A | 11/1997 | Hargreaves et al. |

(Continued)

OTHER PUBLICATIONS

Durron597, How do I hide javascript code in a webpage?, 2011 (Year: 2011).*
(Continued)

*Primary Examiner* — Tarek Elchanti
(74) *Attorney, Agent, or Firm* — DLA PIPER LLP (US); Blake W. Jackson; Thomas Fuller (57) ABSTRACT

The present invention provides improved techniques that can be used to identify hidden content and/or advertisements on a digital display page and to tell the illegitimate pieces of hidden content apart from legitimate ones, which provide reduced levels of false results. For example, a technique involves performing a plurality of analyses on a digital display page to determine whether the digital display page includes content is hidden, wherein each analysis may determine a different result based on whether content in the digital display page is delivered but hidden, comparing the resulting determinations of the analyses, when the analyses all determine that the content is not hidden, classifying the digital display page as not including hidden content, and when at least one analysis determines that the content is not hidden and at least one analysis determines that the content is hidden, classifying the digital display page as including hidden content.

12 Claims, 5 Drawing Sheets

Related U.S. Application Data (60) Provisional application No. 61/973,498, filed on Apr. 1, 2014.

(51) Int. Cl.
*G06Q 30/0201* (2023.01)
*G06Q 30/0251* (2023.01)
*H04L 9/40* (2022.01)

(52) U.S. Cl.
CPC ..... *G06Q 30/0251* (2013.01); *G06Q 30/0277* (2013.01); *H04L 63/1408* (2013.01); *H04L 9/40* (2022.05)

(58) Field of Classification Search
USPC ............. 705/14.47, 14.73; 713/188; 709/218
See application file for complete search history.

(56) References Cited

U.S. PATENT DOCUMENTS

| | | |
|---|---|---|
| 7,418,382 B1 | 8/2008 | Maes |
| 8,578,496 B1* | 11/2013 | Krishnappa ........... G06F 21/316 713/188 |
| 8,745,753 B1 | 6/2014 | Gottlieb et al. |
| 2001/0039622 A1 | 11/2001 | Hitz et al. |
| 2002/0010625 A1 | 1/2002 | Smith et al. |
| 2002/0062382 A1 | 5/2002 | Rhoads et al. |
| 2002/0087599 A1* | 7/2002 | Grant ................... G06F 16/954 715/201 |
| 2002/0130976 A1* | 9/2002 | Gutta ................... H04N 21/475 348/700 |
| 2002/0161467 A1* | 10/2002 | Hashiguchi ........ G05B 23/0229 700/110 |
| 2002/0167540 A1* | 11/2002 | Dobbelaar ............ G06F 16/745 715/716 |
| 2003/0131106 A1 | 7/2003 | Kasriel |
| 2003/0200258 A1 | 10/2003 | Hayashi et al. |
| 2004/0117316 A1 | 6/2004 | Gillum |
| 2004/0162879 A1 | 8/2004 | Arcuri et al. |
| 2004/0205119 A1 | 10/2004 | Streble et al. |
| 2005/0065811 A1 | 3/2005 | Chu et al. |
| 2005/0081138 A1* | 4/2005 | Voss ........................ H04N 21/84 725/135 |
| 2005/0120016 A1* | 6/2005 | Midgley ............... G06F 16/951 707/999.005 |
| 2005/0159999 A1 | 7/2005 | Totten et al. |
| 2005/0235360 A1 | 10/2005 | Pearson |
| 2005/0273368 A1 | 12/2005 | Hutten et al. |
| 2006/0026114 A1 | 2/2006 | Gregoire et al. |
| 2006/0047792 A1 | 3/2006 | Dharmarajan et al. |
| 2006/0074911 A1* | 4/2006 | Neagovici-Negoescu ................... G06F 16/95 |
| 2006/0206715 A1 | 9/2006 | Cowan et al. |
| 2007/0192485 A1 | 8/2007 | McMahan et al. |
| 2008/0052377 A1* | 2/2008 | Light ..................... H04L 51/04 709/218 |
| 2008/0066181 A1 | 3/2008 | Haveson et al. |
| 2008/0114875 A1 | 5/2008 | Anastas et al. |
| 2009/0030794 A1* | 1/2009 | Scheflan ............ G06Q 30/0239 705/14.39 |
| 2009/0248807 A1 | 10/2009 | Fron et al. |
| 2009/0265198 A1 | 10/2009 | Lester et al. |
| 2009/0271509 A1 | 10/2009 | Cao et al. |
| 2009/0313202 A1* | 12/2009 | Grabarnik ............. G06F 16/288 706/50 |
| 2009/0319388 A1 | 12/2009 | Yuan et al. |
| 2010/0082604 A1* | 4/2010 | Gutt .................... G06F 16/3326 707/E17.014 |
| 2010/0094860 A1* | 4/2010 | Lin ..................... G06Q 30/0277 707/804 |
| 2010/0235406 A1* | 9/2010 | Williams ................ G06F 16/93 707/E17.024 |
| 2010/0250714 A1 | 9/2010 | Wehmann et al. |
| 2010/0281046 A1* | 11/2010 | Lee ......................... G06F 16/70 707/769 |
| 2010/0287099 A1 | 11/2010 | Liu et al. |
| 2011/0029393 A1 | 2/2011 | Apprendi et al. |
| 2011/0055023 A1 | 3/2011 | McNeeley et al. |
| 2011/0066521 A1 | 3/2011 | Rowe et al. |
| 2011/0072052 A1 | 3/2011 | Skarin et al. |
| 2011/0125587 A1* | 5/2011 | Netzer ................. G06Q 30/018 705/14.73 |
| 2011/0137733 A1 | 6/2011 | Baird et al. |
| 2011/0179084 A1 | 7/2011 | Waddington et al. |
| 2011/0251951 A1 | 10/2011 | Kolkowitz et al. |
| 2011/0270881 A1 | 11/2011 | Borton |
| 2012/0016633 A1 | 1/2012 | Wittenstein et al. |
| 2012/0022926 A1 | 1/2012 | Ramanathan |
| 2012/0036011 A1 | 2/2012 | Schechter et al. |
| 2013/0060856 A1 | 3/2013 | Fried et al. |
| 2013/0237300 A1 | 9/2013 | Johnson |
| 2013/0339158 A1 | 12/2013 | Xie et al. |
| 2014/0115459 A1 | 4/2014 | Norwood |
| 2014/0229268 A1* | 8/2014 | Clapp ................. G06Q 30/0242 705/14.41 |
| 2014/0236514 A1* | 8/2014 | Icove ....................... H04N 7/18 348/148 |
| 2015/0012811 A1 | 1/2015 | Chan et al. |
| 2015/0161219 A1 | 6/2015 | Bendiabdallah |
| 2015/0262227 A1 | 9/2015 | Messer |

OTHER PUBLICATIONS

Saed Sayad, Decision Tree-Classification, Internet Archive Way Back Machine Capture date of Mar. 12, 2013 from URL: http://www.saedsayad.com/decision_tree.htm.

Trademark Electronic Search System (TESS), Linux, Jan. 4, 2017, United States Patent and Trademark Office.

Stone-Gross B., et al., "Understanding Fraudulent Activities in Online Ad Exchanges," 2011, pp. 279-294.

Trademark Electronic Search System (TESS), "Comscore," Feb. 28, 2017, United States Patent and Trademark Office, 2 pages.

Trademark Electronic Search System (TESS), "Craigslist," Feb. 28, 2017, United States Patent and Trademark Office, 2 pages.

Trademark Electronic Search System (TESS), "Wikipedia," Feb. 28, 2017, United States Patent and Trademark Office, 2 pages.

* cited by examiner

SYSTEM AND METHOD FOR IDENTIFYING HIDDEN CONTENT

CROSS-REFERENCE TO RELATED APPLICATIONS

This application claims the benefit of U.S. Provisional Application No. 61/973,498, filed Apr. 1, 2014, which is incorporated herein in its entirety.

BACKGROUND OF THE INVENTION

1. Field of the Invention

The present invention relates to identifying hidden content and/or advertisements on a digital display page, such as web page, app, etc., and to distinguishing the illegitimate pieces of hidden content from legitimate ones.

2. Description of the Related Art

Web pages contain many different content elements, including advertisements. Some content elements that exist on the page may be hidden from view. Sometimes, they are hidden unintentionally because of an implementation error. Other times, they may intentionally be hidden for legitimate reasons (such as to pre-fetch pieces of content so that they display quickly when the user selects to view them), but many times they are hidden for illegitimate reasons. Illegitimate reasons for hiding content elements may include, but are not limited to, inflating advertisement delivery counts and misleading search engines.

There are many different techniques to hiding content elements on the web page, such as covering the piece of content with another content element on top of it using a z-index or other method or setting an item's visibility property to false. It is also possible to combine different techniques together and/or create variations of each one of these techniques.

Identifying hidden pieces of content or ads is particularly important in situations in which content may be hidden for illegitimate reasons. For example, an advertisement may be invisibly embedded on a web page so that someone gets paid every time the page loads and the ad is delivered to the browser, even though it is not visibly displayed. Some publishers may embed a very large number of ads invisibly on the page. The ads are made invisible when there is a desire to make a large profit from advertisements, but not negatively impact the user experience by "cluttering" the page with ads or in order to avoid detection by rudimentary review. Hence they are made invisible.

Traditional techniques of identifying hidden pieces of content relied on analyzing the html code of the web page and looking for various different html signatures that imply that a certain piece of content is hidden. For example, a traditional technique involved looking for an item with a negative z-index property or an item whose visibility property is set to false. The problem with this traditional technique is that because implementations can vary significantly, such traditional techniques yield a very high percentage of both false positives and false negatives.

A need arises for improved techniques that can be used to identify hidden content and/or advertisements on a web page and to tell the illegitimate pieces of hidden content apart from legitimate ones, which provide reduced levels of false results.

SUMMARY OF THE INVENTION

The present invention provides improved techniques that can be used to identify hidden content and/or advertisements on a digital display page, such as a web page, app, etc., and to tell the illegitimate pieces of hidden content apart from legitimate ones, which provide reduced levels of false results.

For example, a technique involves analyzing rendered code for a digital display page to identify objects, fetching graphic images displayed in the objects, creating a repository of the graphic images, saving a rendered version of the page as an image, using an image analysis algorithm to identify "visible" images, and marking the remaining images as "invisible", and classifying the digital display page accordingly.

As another example, a technique involves analyzing code for a digital display page by performing a geometric analysis of a location of an object to identify whether the object is within the viewable portion of the screen, performing a resource-based analysis to measure computer resources to determine whether the computer is optimizing the object for display on the screen, and when an object is identified as viewable based on the geometric analysis while at the same time considered not viewable based on the resource based analysis, the conclusion is that this object is an invisible object, and the object and digital display page are classified accordingly.

As another example, a technique involves performing a plurality of analyses on a digital display page to determine whether the digital display page includes content is hidden, wherein each analysis may determine a different result based on whether content in the digital display page is delivered but hidden, comparing the resulting determinations of the analyses, when the analyses all determine that the content is not hidden, classifying the digital display page as not including hidden content, and when at least one analysis determines that the content is not hidden and at least one analysis determines that the content is hidden, classifying the digital display page as including hidden content.

DETAILED DESCRIPTION OF THE INVENTION

The present invention provides improved techniques that can be used to identify hidden content and/or advertisements on a web page and to tell the illegitimate pieces of hidden content apart from legitimate ones, which provide reduced levels of false results.

Figure 1:
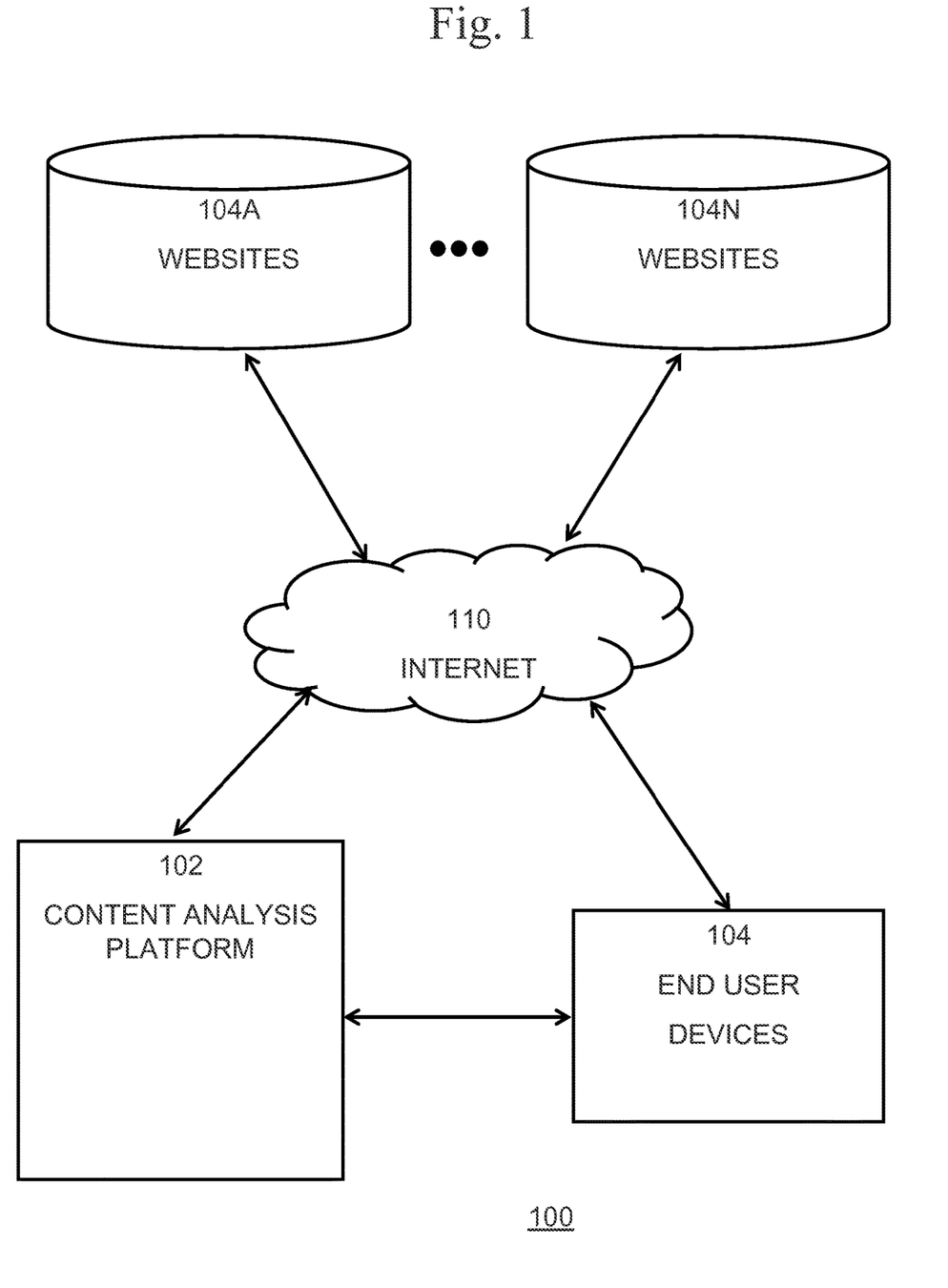
FIG. 1 is an exemplary block diagram of an embodiment of a system for identifying hidden content and/or advertisements on a web page.

An exemplary system for identifying hidden content and/or advertisements on a web page is shown in FIG. 1. The system of FIG. 1 includes, but is not limited to, content analysis platform 102, end user devices 104, websites 106A-N, such as search engines, commerce websites, news websites, social media websites, etc., all of which may be coupled together over a communications network, such as the Internet 108. Content analysis platform 102 typically includes, but is not limited to, a CPU, memory, network interface and computer program instructions stored in memory and executed by the CPU to implement the functions and methods disclosed herein. The end user devices 104 may include devices such as personal computers, workstations, tablet computers, smartphones, etc., that implement one or more standard browsing platforms to issue requests for the content analysis platform 102 to perform the functions described herein. Alternatively, the functions of end user devices 104 may be performed by or within content analysis platform 102.

Figure 2:
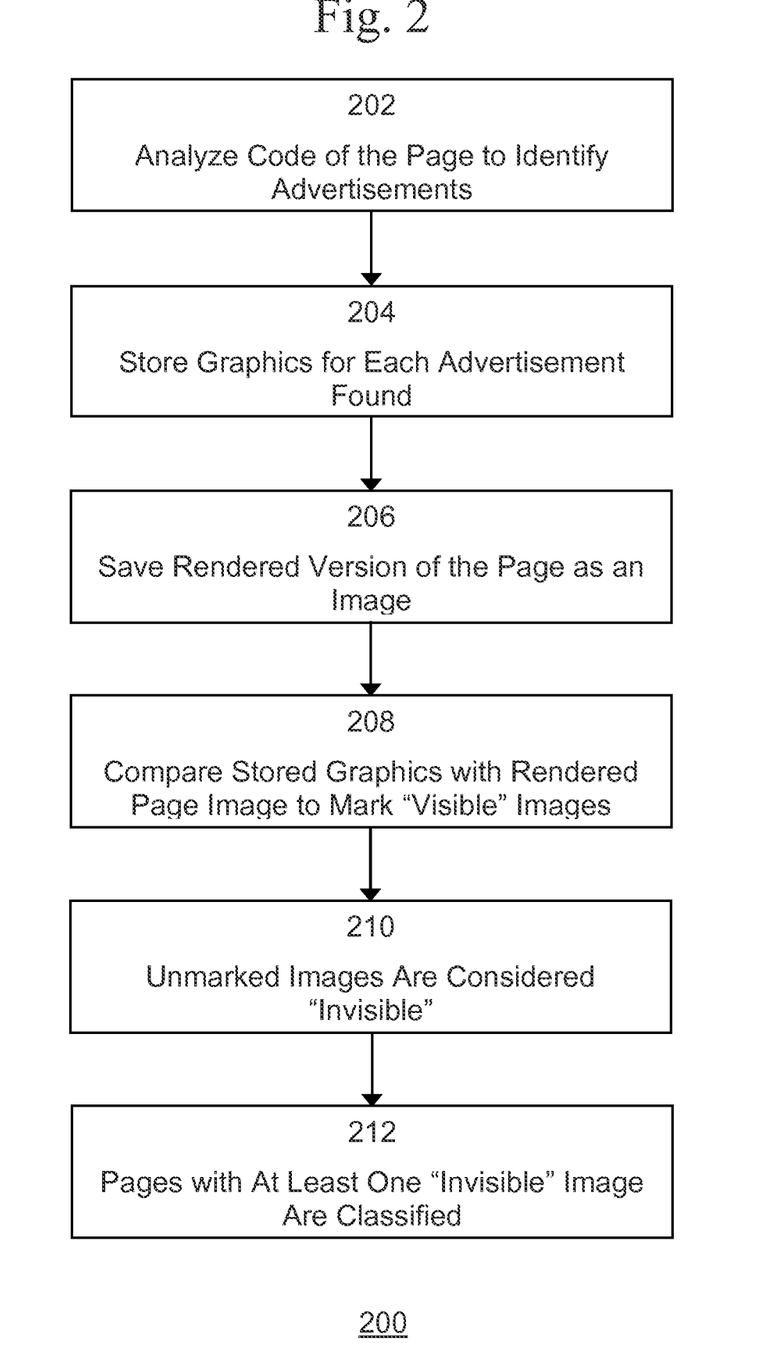
FIG. 2 is an exemplary flow diagram of an embodiment of a process for identifying hidden advertisements or hidden content situations on a web page.

An example of a process 200 for identifying hidden advertisements or hidden content situations on a web page is shown in FIG. 2. Process 200 may be implemented in content analysis platform 102, shown in FIG. 1. Process 200 begins with step 202, in which a page that may include advertisements or other content is received. Typically, such advertisements or content are captured using a crawler, which may be implemented in content analysis platform 102, or a client side browser plugin, which may be implemented in content analysis platform 102 and/or end user devices 104 or through click-stream data. The page is analyzed to identify advertisements or other content. For example, the rendered html code of the page may be analyzed. (See U.S. Pat. No. 8,583,482, issued Nov. 12, 2013, entitled "Automated Monitoring and Verification of Internet Based Advertising", the contents of which are incorporated by reference herein, for an example of a suitable technique to identify the existence and location of an advertisement). The analysis will identify all advertisements or content embedded in the page, whether visible or not.

Rendered html code may be obtained in one of several ways. For example, a crawler can visit the page, download the page content and render or cause the browser to render the web page. For another example, a plugin installed in a browser can access the web page rendered by the browser. For another example, a piece of html code embedded in the page can access the browser document object module (DOM) to get access to the rendered page. Once the page is rendered, advertisements or other content can be identified in one of multiple ways. For example, the process may look for known ad server "signatures" on the page and/or known ad sizes. Pieces of content may similarly be identified by looking for known types of content elements via the Document Object Model (DOM).

In step 204, whenever an advertisement or content is identified, the "creative"—the graphic images displayed in the advertisement or content, may be extracted and stored. This may create a repository of the graphic images of all the advertisements or content embedded in the web page, whether visible or not.

In step 206, a rendered version of the page may be saved as an image. This may be termed a rendered page image or a page screenshot. The rendered image will contain all the elements that are viewable on the page, as a user might see them. Hence elements that are hidden will not be visible in the rendered page image.

In step 206, image analysis software may be used to compare between the graphic images obtained in step 204 and the rendered page image obtained in step 206. The image analysis software may try to identify each of the graphic images contained within the rendered page image by comparing them with the graphic images in the repository. Any image that is from the rendered page image that is found in the repository is marked as "visible". Any standard image analysis software capable of comparing and identifying images may be used.

In step 210, once all the images obtained in step 204 have been compared with the rendered page image obtained in step 206, any remaining images that have not been marked as "visible" are considered "invisible" advertisements or content.

In step 210, if the page contains at least one invisible advertisement or content, the page may be classified as "contains invisible advertisements" or content.

Process 200 may requires an additional step when the graphic images of the advertisements or content contain animation. When animation is included, the rendered page screenshot that is captured may have randomly captured any frame of the animation. Therefore, to compare effectively, the images fetched in step 204 that contain animation need to be broken down into multiple images, wherein each frame of the animation becomes a separate individual image that is ultimately compared to the page screenshot in step 2064.

Figure 3:
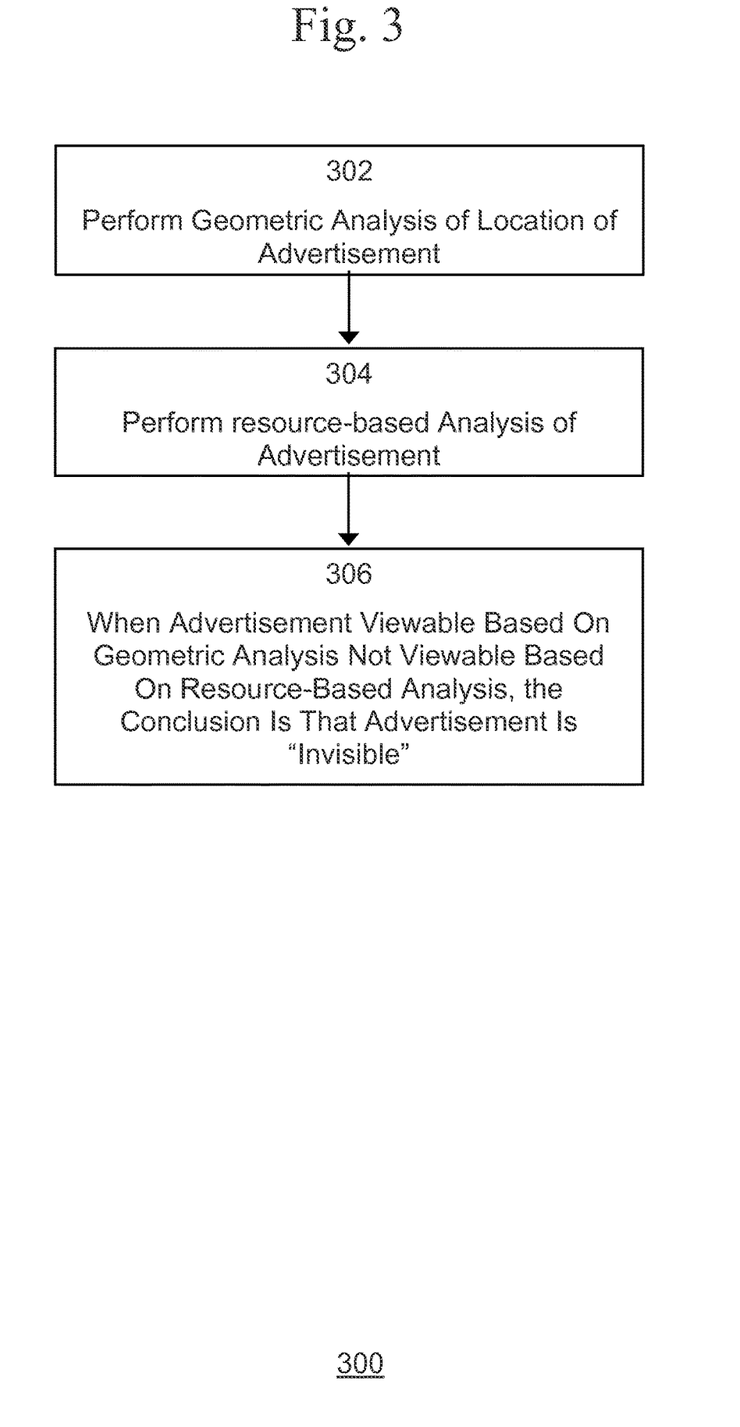
FIG. 3 is an exemplary flow diagram of an embodiment of a process for identifying hidden advertisements or hidden content situations on a web page.

An example of a process 300 for identifying hidden advertisements or hidden content on a web page is shown in FIG. 3. Process 300 may be implemented in content analysis platform 102, shown in FIG. 1. In this example, the method does not require a crawler or a client side browser plugin to be used. Rather, the process may be implemented by including a code snippet in the advertisement in question itself or embedded in the web page. This code snippet may be inserted by the advertiser, the publisher, or any intermediary in the advertisement or content delivery chain.

Process 300 begins with step 302, in which, when the advertisement or content is delivered to the page, a geometric analysis of the location of the advertisement or content may be done by the code snippet to identify if the advertisement or content is within the viewable portion of the screen (viewport). This analysis may be based on calculating the location of the advertisement or content on the page, the location of the viewable areas of the browser within the page, and the size of the open browser window. Based on these calculations, it may be determined whether the advertisement or content is located in an area that is viewable to the user, such as within the browser window, with the browser window in focus and not covered by other applications. In this example, if an advertisement or content is within the viewable viewport but is made invisible using one of the methods described above, it would still be considered viewable based on the geometric analysis approach.

In step 304, a resource-based analysis may be performed in addition to the geometric analysis performed in step 302. The resource-based analysis may be performed simultaneously to the geometric analysis of step 302 and may use a variety of methods to measure the computer resources in order to conclude whether the computer is optimizing the advertisement or content for display on the screen. For example, a higher amount of CPU resource utilization may imply advertisement or content is being optimized. If the resource based analysis identifies that the advertisement or content is being optimized, then it is concluded to be visible. Note that an advertisement or content that is within the viewable viewport as determined in step 302, but is made invisible based using any number of techniques, including those described above, would be considered not visible using the resource based method since it wasn't "drawn" on the screen.

In step 306, when an advertisement or content is identified as viewable based on the geometric analysis while at the same time considered not viewable based on the resource based analysis, the conclusion is that this advertisement or content is "invisible", and the advertisement or content unit and web page could be classified accordingly.

Figure 4:
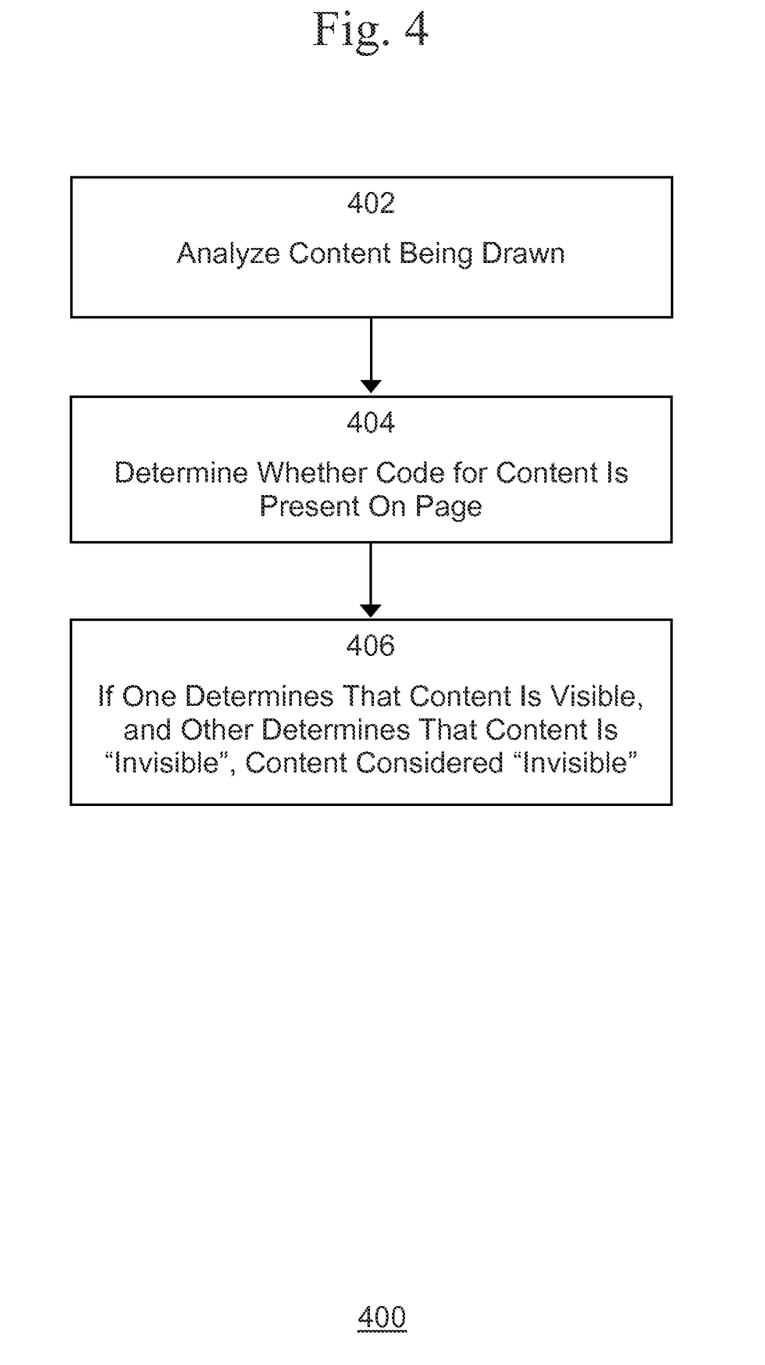
FIG. 4 is an exemplary flow diagram of an embodiment of a process for identifying hidden advertisements or hidden content situations on a web page.

As another example, a general process 400 for identifying hidden advertisements or hidden content situations on a web page is shown in FIG. 4. In this example, to identify an invisible advertisement or piece of content, two different methods are employed simultaneously to identify whether the advertisement or the content has the opportunity to be viewed. Process 400 begins with step 402, in which advertisement or content may be actually "drawn" on the screen or viewport. Examples of such steps, may include, but are not limited to, the page-rendering method described in step 206 of FIG. 2, or the resource-based method described in step 304 of FIG. 3.

In step 404, a code analysis may be performed. For example, it may be computationally determined whether the code for the advertisement or piece of content was present on the web page. Examples of such steps, may include, but are not limited to, identifying the existence of the advertisement or content and saving the creative or graphic elements as described in step 204 of FIG. 2, or using the geometric analysis as described in step 302 of FIG. 3.

In step 406, if one method determines that the advertisement or content was visible and the other method determines that the advertisement or content was not visible, at the same point in time, then the process considers the advertisement or content to be "invisible".

Figure 5:
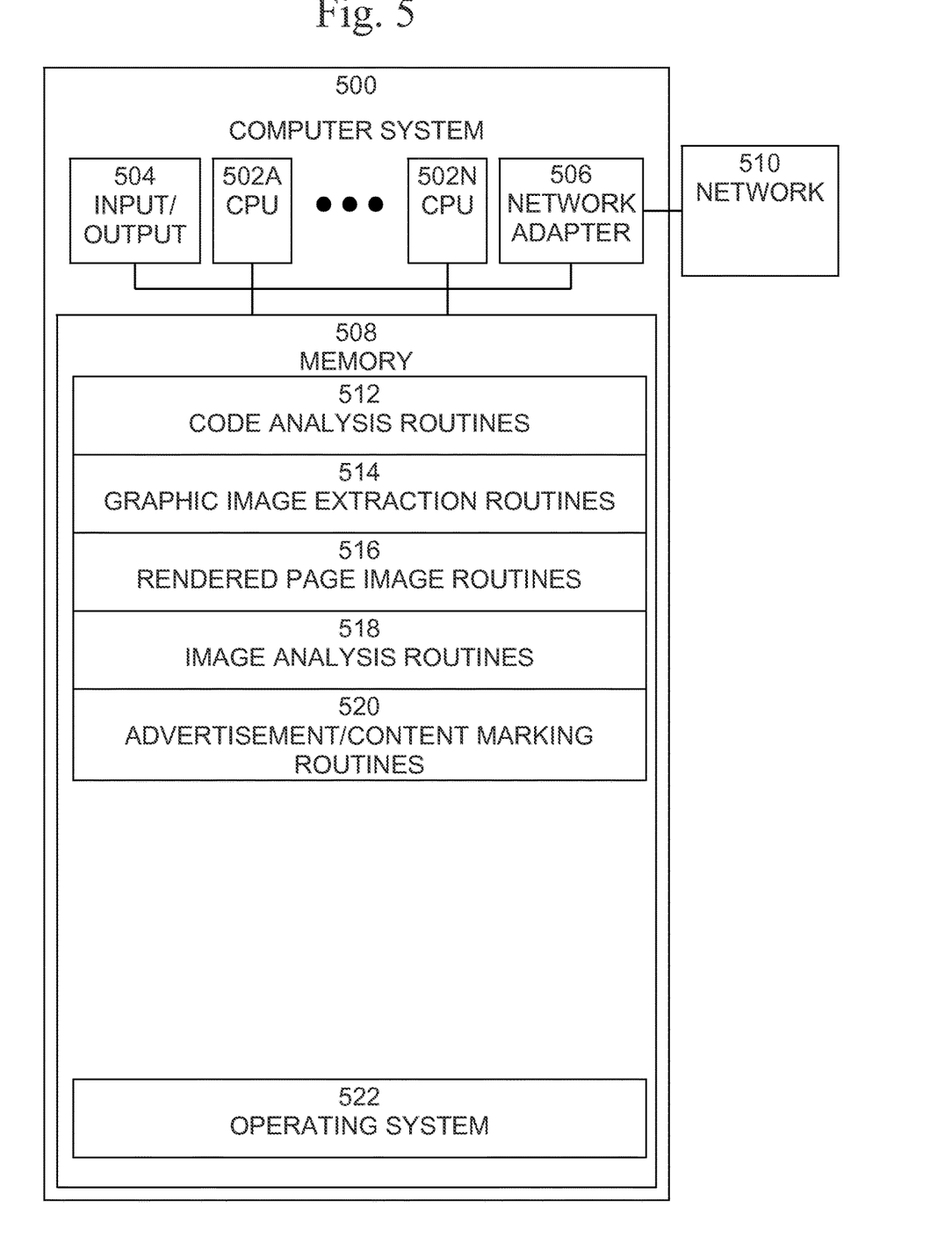
FIG. 5 is an exemplary block diagram of an embodiment of a system for identifying hidden content and/or advertisements on a web page.

An exemplary block diagram of a computer system 500, in which the processes shown above may be implemented, is shown in FIG. 5. Computer system 500 is typically a programmed general-purpose computer system, such as a personal computer, workstation, server system, and minicomputer or mainframe computer. Computer system 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 varies depending upon the function that computer system 500 is programmed to perform. In the example shown in FIG. 5, memory contents that may be included in a system in which a content analysis platform is implemented are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 may include code analysis routines 512, graphic image extraction routines 514, rendered page image routines 516, image analysis routines 518, geometric analysis routines 520, resource-based analysis routines 522, advertisement/content marking routines 524, and operating system 530. Code analysis routines 512 may computationally determine whether the code for an advertisement or piece of content is present on the web page, such as may be performed by step 202 of FIG. 2 and step 404 of FIG. 4. Graphic image extraction routines 514 may extract and store graphic images displayed in an advertisement or content, such as may be performed by step 204 of FIG. 2. Rendered page image routines 516, may save a rendered version of a page as an image, such as may be performed by step 206 of FIG. 2. Image analysis routines 518 may be used to compare between the extracted graphic images and the rendered page image, such as may be performed by step 208 of FIG. 2. Advertisement/content marking routines 520 may determine whether to mark an advertisement or content as "invisible", based on the results of other routines, such as may be performed in steps 210 and 212 of FIG. 2, step 306 of FIG. 3, and step 406 of FIG. 4. Operating system 522 provides overall system functionality.

It is to be noted that additional functionality may be implemented in end user devices, such as end user devices 104 shown in FIG. 1. End user systems may be computer systems having a structure similar to that shown in FIG. 5. Such end user systems may include geometric analysis routines to perform geometric analysis of a location of an advertisement or content, such as may be performed by step 302 of FIG. 3. Likewise, such end user systems may include resource-based analysis routines to determine whether a computer is optimizing an advertisement or content for display on the screen, such as may be performed by step 302 of FIG. 3.

As shown in FIG. 5, the present invention contemplates implementation on a system or systems that provide multi-processor, multi-tasking, multi-process, and/or multi-thread computing, as well as implementation on systems that provide only single processor, single thread computing.

Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention may be implemented in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method performed by a content analysis server for identifying hidden content, the method comprising:
    obtaining rendered code for a digital display page using any of a web crawler implemented on the content analysis server to download page content and cause a browser to render the digital display page, a piece of hypertext markup language (html) code obtained via the web crawler to access a document object module (DOM) for the digital display page, or a plugin implemented on any of the content analysis server or an end user device to access the digital display page rendered on the browser;
    analyzing the rendered code for the digital display page to identify one or more objects embedded in the digital display page by inspecting data types in the DOM for known types that correspond with objects and inspecting signatures and/or content sizes in the DOM that correspond with objects;
    extracting graphic images displayed in the objects included in the digital display page and identified from the DOM;
    creating a repository of the extracted graphic images at a memory of the content analysis server, wherein the extracted graphic images are arranged in the repository by at least one characteristic, and wherein the repository is configured to store extracted graphic images that are visible or invisible on the digital display page;
    rendering the rendered code for the digital display page at the content analysis server using the DOM to cause display of a rendered version of digital display page and saving the rendered version of the digital display page as a rendered page image file at the memory of the content analysis server;
    performing a geometric analysis of the digital display page by:
        calculating, for each extracted graphic image, a location of the extracted graphic image on the digital display page based on inspecting the DOM;
        identifying a viewable portion of the digital display page; and
        determining, for each extracted graphic image, whether the extracted graphic image is outside the viewable portion of the digital display page, wherein all extracted graphic images outside the viewable portion of the digital display page are marked as invisible images in the repository;
    determining, for each extracted graphic image, whether a threshold amount of CPU resources are used for optimizing each extracted graphic image, wherein each extracted graphic image that has the threshold amount of CPU resources used to optimize the extracted graphic image is marked as visible images in the repository;
    comparing the extracted graphic images stored in the repository to the rendered page image file to identify all extracted graphic images from the repository that are included within the rendered page image file by using an image analysis routine to determine whether a threshold number of pixels of each extracted graphic image are represented in the rendered page image file, wherein extracted graphic images that are identified in the rendered page image are marked as visible images in the repository, and extracted graphic images that are not identified in the rendered page image are marked as invisible images in the repository; and
    when one or more extracted graphical images are marked as invisible images, classifying the digital display page as containing hidden content.

2. The method of claim 1, wherein the digital display page is classified as containing an invisible object if any extracted graphic image of the digital display page is marked as an invisible image.

3. The method of claim 1, wherein, when there is identified an animated object in a digital display page, each frame of the animation is extracted as a separate graphic image of the animated object, and the animated object is marked as a visible object if any of the separate graphic images of the animated object is identified in the rendered page image as a visible image.

4. A system for identifying hidden content comprising a processor, memory accessible by the processor, and program instructions and data stored in the memory, the program instructions executable by the processor to perform a method of comprising:
    obtaining rendered code for a digital display page using any of a web crawler implemented on the system to download page content and cause a browser to render the digital display page, a piece of hypertext markup language (html) code obtained via the web crawler to access a document object module (DOM) for the digital display page, or a plugin implemented on any of the system or an end user device to access the digital display page rendered on the browser;

analyzing the rendered code for the digital display page to identify one or more objects embedded in the digital display page by inspecting data types in the DOM for known types that correspond with objects and inspecting signatures and/or content sizes in the DOM that correspond with objects;

extracting graphic images displayed in the objects included in the digital display page and identified from the DOM;

creating a repository of the extracted graphic images at the memory, wherein the extracted graphic images are arranged in the repository by at least one characteristic, and wherein the repository is configured to store extracted graphic images that are visible or invisible on the digital display page;

rendering the rendered code for the digital display page at the system using the DOM to cause display of a rendered version of digital display page and saving the rendered version of the digital display page as a rendered page image file at the memory;

performing a geometric analysis of the digital display page by:
  calculating, for each extracted graphic image, a location of the extracted graphic image on the digital display page based on inspecting the DOM;
  identifying a viewable portion of the digital display page; and
  determining, for each extracted graphic image, whether the extracted graphic image is outside the viewable portion of the digital display page, wherein all extracted graphic images outside the viewable portion of the digital display page are marked as invisible images in the repository;

determining, for each extracted graphic image, whether a threshold amount of CPU resources are used for optimizing each extracted graphic image, wherein each extracted graphic image that has the threshold amount of CPU resources used to optimize the extracted graphic image is marked as visible images in the repository;

comparing the extracted graphic images stored in the repository to the rendered page image file to identify all extracted graphic images from the repository that are included within the rendered page image file by using an image analysis routine to determine whether a threshold number of pixels of each extracted graphic image are represented in the rendered page image file, wherein extracted graphic images that are identified in the rendered page image are marked as visible images in the repository, and extracted graphic images that are not identified in the rendered page image are marked as invisible images in the repository; and when one or more extracted graphical images are marked as invisible images, classifying the digital display page as containing hidden content.

5. The system of claim 4, wherein the system is configured to compare the extracted graphic images in the repository to the rendered page image using image analysis to compare each extracted graphic image in the repository with graphic images contained within the rendered page image, and to identify as visible those extracted graphic images in the repository that match with a graphic image within the rendered page image.

6. The system of claim 4, wherein the system is configured to classify a digital display page as containing an invisible object if any extracted graphic image of the digital display page is marked as an invisible image.

7. The system of claim 4, wherein the system is configured such that, when there is identified an animated object in a digital display page, each frame of the animation is extracted as a separate graphic image of the animated object, and the animated object is marked as a visible object if any of the separate graphic images of the animated object is identified in the rendered page image as a visible image.

8. A computer program product for identifying hidden content comprising a non-transitory computer readable medium storing program instructions that when executed by a processor perform a method comprising:

obtaining rendered code for a digital display page using any of a web crawler implemented on the computer program product to download page content and cause a browser to render the digital display page, a piece of hypertext markup language (html) code obtained via the web crawler to access a document object module (DOM) for the digital display page, or a plugin implemented on any of the computer program product or an end user device to access the digital display page rendered on the browser;

analyzing the rendered code for the digital display page to identify one or more objects embedded in the digital display page by inspecting data types in the DOM for known types that correspond with objects and inspecting signatures and/or content sizes in the DOM that correspond with objects;

extracting graphic images displayed in the objects included in the digital display page and identified from the DOM;

creating a repository of the extracted graphic images at the memory, wherein the extracted graphic images are arranged in the repository by at least one characteristic, and wherein the repository is configured to store extracted graphic images that are visible or invisible on the digital display page;

rendering the rendered code for the digital display page at the computer program product using the DOM to cause display of a rendered version of digital display page and saving the rendered version of the digital display page as a rendered page image file at the memory;

performing a geometric analysis of the digital display page by:
  calculating, for each extracted graphic image, a location of the extracted graphic image on the digital display page based on inspecting the DOM;
  identifying a viewable portion of the digital display page; and
  determining, for each extracted graphic image, whether the extracted graphic image is outside the viewable portion of the digital display page, wherein all extracted graphic images outside the viewable portion of the digital display page are marked as invisible images in the repository;

determining, for each extracted graphic image, whether a threshold amount of CPU resources are used for optimizing each extracted graphic image, wherein each extracted graphic image that has the threshold amount of CPU resources used to optimize the extracted graphic image is marked as visible images in the repository;

comparing the extracted graphic images stored in the repository to the rendered page image file to identify all extracted graphic images from the repository that are included within the rendered page image file by using an image analysis routine to determine whether a threshold number of pixels of each extracted graphic image are represented in the rendered page image file, where in extracted graphic images that are identified in the rendered page image are marked as visible images in the repository, and extracted graphic images that are not identified in the rendered page image are marked as invisible images in the repository; and when one or more extracted graphical images are marked as invisible images, classifying the digital display page as containing hidden content.

9. The computer program product of claim 8, wherein the program instructions are executable to capture the rendered code for the digital display page using a crawler or a client side browser plugin.

10. The computer program product of claim 8, wherein the program instructions are executable to compare the extracted graphic images in the repository to the rendered page image using image analysis to compare each extracted graphic image in the repository with graphic images contained within the rendered page image, and to identify as visible those extracted graphic images in the repository that match with a graphic image within the rendered page image.

11. The computer program product of claim 8, wherein the program instructions are executable to classify a digital display page as containing an invisible object if any extracted graphic image of the digital display page is marked as an invisible image.

12. The computer program product of claim 8, wherein the program instructions are executable such that, when there is identified an animated object in a digital display page, each frame of the animation is extracted as a separate graphic image of the animated object, and the animated object is marked as a visible object if any of the separate graphic images of the animated object is identified in the rendered page image as a visible image.

\* \* \* \* \*